Figure 1:
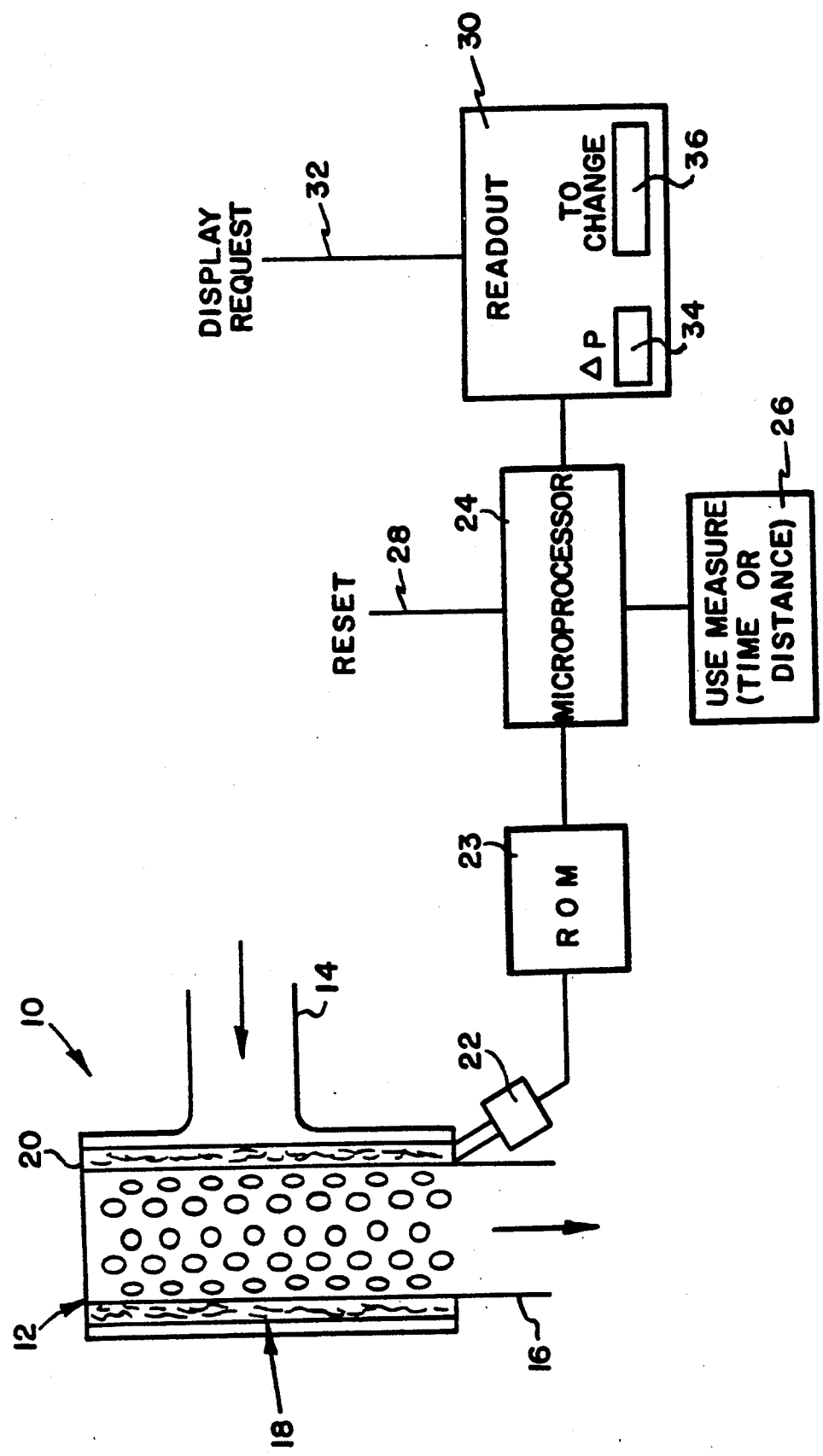

United States Patent [19]

Conti

[11] Patent Number: 5,036,698

[45] Date of Patent: Aug. 6, 1991

[54] METHOD AND APPARATUS FOR PREDICTING LIFE OF AIR FILTER CARTRIDGES

[75] Inventor: Kenneth A. Conti, Barrington, R.I.

[73] Assignee: Allied-Signal Inc., Morristown, N.J.

[21] Appl. No.: 519,058

[22] Filed: May 4, 1990

[51] Int. Cl.5 .................................................. G01N 15/08
[52] U.S. Cl. .................................. 73/38; 116/DIG. 25
[58] Field of Search ....................... 73/38; 55/270, 274; 116/DIG. 25; 340/607

[56] References Cited

U.S. PATENT DOCUMENTS

| | | | |
|---|---|---|---|
| 3,034,337 | 5/1962 | Parmater | 73/38 |
| 3,194,056 | 7/1965 | Hopkins et al. | 73/38 |
| 3,325,010 | 6/1967 | Sackett | 73/38 X |
| 3,473,876 | 10/1969 | Steinberg | |
| 4,014,209 | 3/1977 | Emerick | 73/38 X |
| 4,033,733 | 7/1977 | Nelson | 73/38 X |
| 4,050,291 | 9/1977 | Nelson | 73/38 |
| 4,366,717 | 1/1983 | Foord et al. | 73/38 X |
| 4,389,903 | 6/1983 | Bertone et al. | 340/607 X |
| 4,445,456 | 5/1984 | Nelson | 116/268 |
| 4,492,079 | 1/1985 | Takagi et al. | 73/38 X |
| 4,751,501 | 6/1988 | Gut | 73/38 X |
| 4,784,675 | 11/1988 | Leber et al. | 55/213 |

FOREIGN PATENT DOCUMENTS

| | | |
|---|---|---|
| 60/147210 | 8/1985 | Japan . |
| 60/147211 | 8/1985 | Japan . |
| 60/147212 | 8/1985 | Japan . |
| 63/194711 | 8/1988 | Japan . |
| 63/205114 | 8/1988 | Japan . |

Primary Examiner—Hezron E. Williams
Assistant Examiner—Joseph W. Roskos
Attorney, Agent, or Firm—Ken C. Decker; William N. Antonis

[57] ABSTRACT

A method and apparatus for predicting the remaining service life of an air filter element reads the pressure drop across the filter element at regular usage intervals (such as engine run time or distance the vehicle has traveled). An approximation of the rate at which the pressure drop is increasing is made, which is used to calculate the usage at which the maximum pressure drop will be attained.

12 Claims, 2 Drawing Sheets

METHOD AND APPARATUS FOR PREDICTING LIFE OF AIR FILTER CARTRIDGES

This invention relates to a method and apparatus for predicting the remaining service life of an air filter element for the combustion air induction system of an internal combustion engine.

Large commercial vehicles, such as heavy line haul trucks and construction equipment, are commonly equipped with diesel engines that require large quantities of combustion air. Accordingly, these vehicles are equipped with heavy duty inlet air filters to remove contaminant particles from the combustion air used by the engine. These heavy duty air filters include a filter element for capturing the particulate contaminants. As the filter element is used, the pressure drop across the filter element gradually increases. Increased restriction causes poor fuel economy and can result in engine stoppage. Accordingly, it has become common to provide restriction indicators which measure the pressure drop across the element. These restriction indicators are used by a mechanic to decide whether to change the filter element during routine servicing. However, typical filter element life is relatively long. Filter element life of 50,000 to 100,000 miles is typical, but 200,000 mile service lives are not uncommon. If such filter elements are used on construction equipment used in dirty environments, service life can be much less, and it is not uncommon for filter elements to be changed once each week in such applications.

Accordingly, since filter life can vary widely, due to the manner in which the vehicle is used, it is sometimes difficult for the mechanic servicing the vehicle to decide whether to change the filter element or not. This is particularly true when the pressure differential across the element has reached a level near the absolute change point but is not yet there. If the mechanic decides to change the element too soon, valuable filter life is wasted, but if the mechanic decides not to change the element, the vehicle may be shut down on the road. Accordingly, a method and apparatus for predicting accurately the remaining filter life, based on the actual vehicle's filter performance from installation of the filter element to the date of inspection, is desirable.

The present invention uses existing filter restriction indicators, which generate an electrical signal which varies according to the restriction across the filter element, to read the pressure drop across the filter element at periodic intervals as the vehicle is used. The periodic intervals may be based upon the distance that the vehicle has traveled or on engine running time. This data is stored in a table, and a curve is fitted to the data. It has been discovered that the relationship between usage and pressure drop across the filter element is generally a semilogarithmic relationship. Accordingly, the curve fitted to the data is in the form of:

$$ln(y) = mx + b$$

where y is the pressure drop across the filter element and x is usage, expressed either in distance that the vehicle has traveled or in the time that the engine has run. Since the curve is a straight line, an indication of total usage at which the element must be replaced may be generated after only two data points are collected. After fitting the curve, the slope m and constant b can be calculated. This data can then be used to solve the equation for the mileage or time representing the maximum pressure drop permitted across the filter. This mileage or time is the maximum usage permitted the filter element. As more data points are gathered the curve can be re-fitted for more accuracy. Thus, the longer the filter element has been used, the more accurate the prediction of remaining life becomes. The difference between this maximum usage and the existing usage is the remaining life of the filter element.

While it is also possible to fit a polynomial curve function to the data, the resulting equation is not linear and prediction values will vary widely, and many more data points will be required for accuracy. Accordingly, using the straight line semilogarithmic function is preferred, but the present invention is not limited to using a semilogarithmic function. Polynomials of various forms may also be used.

Figure 3:
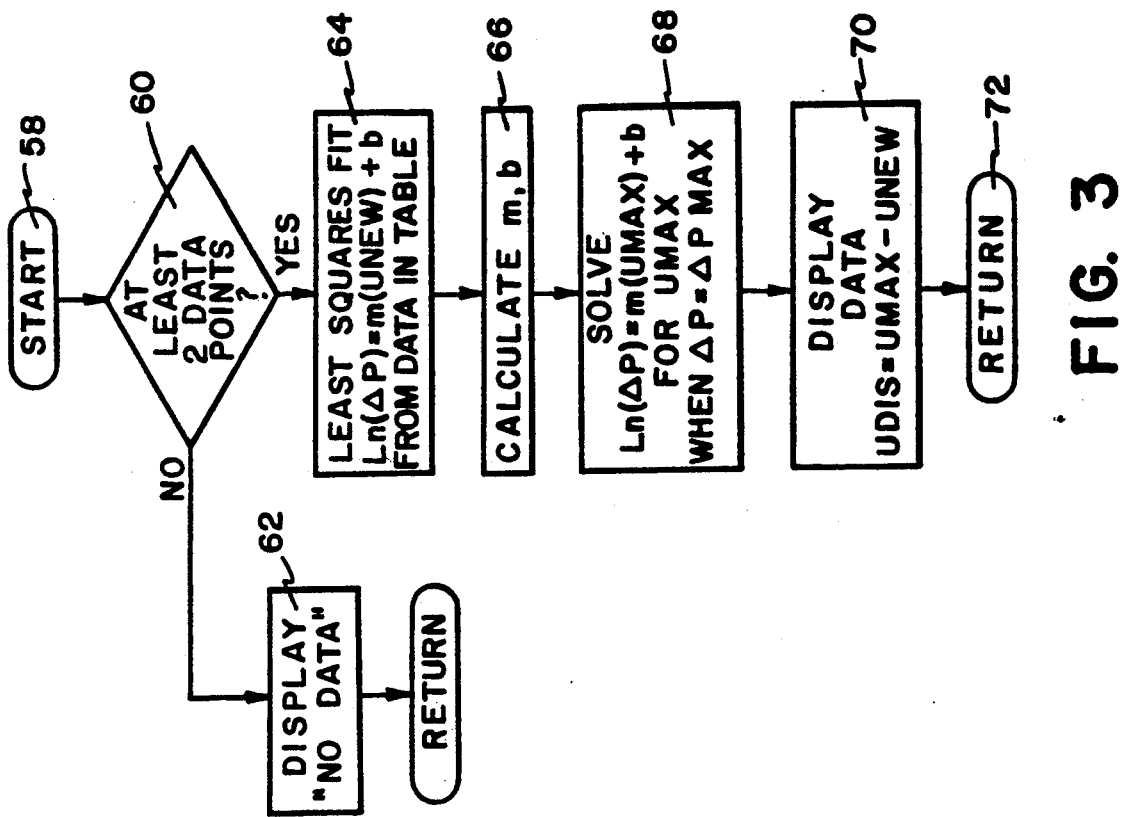
Figure 2:
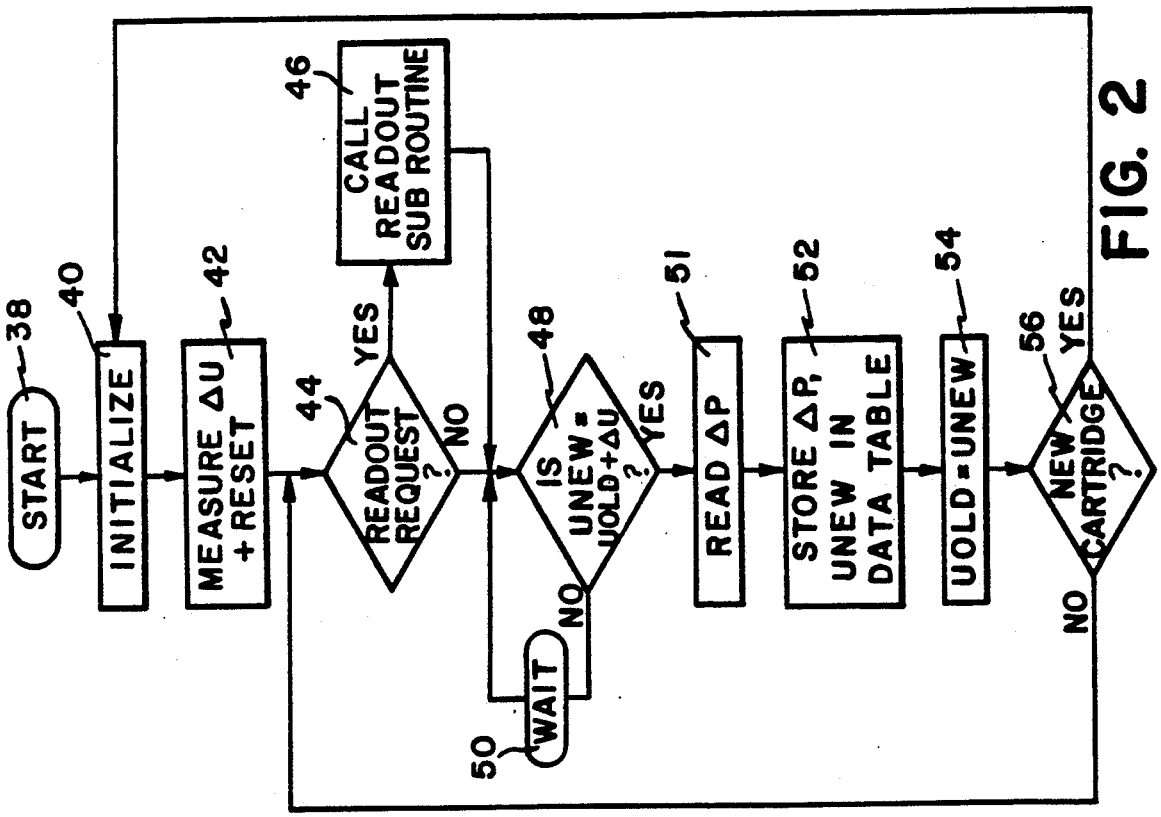

These and other features of the present invention will become apparent from the following description, with reference to the accompanying drawings, in which FIG. 1 is a diagrammatic illustration of the system used in performing the method of the present invention;

FIG. 2 is a detailed diagram illustrating the program method according to the present invention; and FIG. 3 is a diagrammatic illustration of a subroutine used in the program illustrated in FIG. 2.

Referring now to FIG. 1 of the drawings, a conventional heavy duty air filter is illustrated diagrammatically at 10. Air filter 10 includes a housing 12 having an inlet 14, which is communicated to an ambient air source, and an outlet 16, which is communicated to the engine induction manifold. A filter cartridge 18 is installed within the housing 12 for filtering the air communicated between the inlet and outlet. The filter element 18 is a conventional pleated paper filter element comprising a conventional circumferentially extending array of radially tapering pleats 20. A pressure differential sensor 22 is installed on the housing 12 and generates an electrical signal which varies in accordance with the pressure differential across the pleats 20. Pressure differential sensor 22 is conventional and will not be described in detail herein.

The output of the pressure differential sensor 22 is transmitted to a read only memory (ROM) 23, which is under the control of, and supplies data to, a microprocessor 24 which is programmed, as will hereinafter be described, in accordance with the flow charts illustrated in FIGS. 2 and 3. Microprocessor 24 includes a second input which is connected to a mechanism which measures usage of the engine, as indicated at 26. This use measurement may be either the distance the vehicle travels, or the time that the engine of the vehicle is run. A reset input 28 to the microprocessor 24 is operated when the filter cartridge is changed to reset the program, as will hereinafter be described. The output of the microprocessor 24 is connected to a digital readout device 30. Upon operation of the display request input 32 by, for example, the mechanic servicing the vehicle or the vehicle operator, the readout display 30 displays the current pressure drop across the filter cartridge at 34, and it also displays, as at 36, the additional expected usage of the vehicle before the filter cartridge 18 must be changed. The usage displayed at 36 may be, for example, the additional distance that the vehicle will travel before change of the cartridge 18 will be necessary, the odometer reading at which the change is necessary, or additional vehicle run time.

Referring now to FIG. 2, the manner in which the method according to the invention is implemented and by programming the microprocessor 24 is illustrated. The program is started as indicated at 38, and all the variables are initialized as at 40. An internal timer within the microprocessor is set for a predetermined usage interval ΔU as indicated at 42. ΔU may be chosen at any particular time or distance interval. As indicated at 42, the timer times the interval and then automatically resets itself to time the interval again. Each time that the timer times out the ROM 23 will be signaled, as explained hereafter, to record the pressure drop ΔP across the filter element 18. Although measuring restriction at predetermined usage intervals gathers data to make accurate predictions relatively quickly; it is not necessary to use specific measured intervals. For example, the restriction may be read only upon operation of the display request input 32 so that the complexity of the timer may be eliminated from the system, although predictions will be less accurate because input 32 will normally be operated very infrequently. An inquiry is then made, as indicated at 44, to determine if a display request has been received on the input 32 of the readout device 30. If a readout request has been received, the readout subroutine illustrated in FIG. 3 will be called as indicated at 46. The usage variable, UOLD, which, as discussed above, may be the distance the vehicle has traveled or engine run time, is tested to see if it has been increased by the increment U and, when UOLD has been increased by the increment U, the variable UNEW is set equal to this sum, as indicated at 48. If UOLD has not yet been increased by the increment U, the program waits as indicated at 50 to a time equal to the cycle time of the program and then tests to see if UOLD has been increased by the usage increment U. The program then proceeds to cause the ROM 23 to record the pressure differential across the filter element, as indicated at 51. The data UNEW, the total usage since the filter cartridge was installed, and the pressure differential P for the usage variable UNEW is then stored in the ROM 23 as indicated at 52. Accordingly, the ROM 23 will include a series of measurements of pressure differential across the filter element 18 at various usages, each of which represents an incremental usage U from the former usage measurement. Again, the usage measurements may be either the distance traveled by the vehicle or engine run time. UOLD is then set equal to UNEW as indicated at 54. The program then tests, as indicated at 56, to determine if the reset input 28 has been activated, indicating that a new filter cartridge has been installed. If a new filter cartridge has been installed, the program returns to the initialize step indicated at 40, and if a new cartridge has not been installed, the program branches back to the readout request test at 44.

Referring to FIG. 3, the readout subroutine, which is called in response to the readout request test at 44, starts as indicated at 58. The program then tests, as indicated at 60, to determine whether at least two sets of data UNEW, P are stored in the table. As discussed above, the two values of UNEW will differ by the increment U, so that the readings for the pressure drop across the filter element 18 will be measured at different times. If there are less than two data points, the curve fitting as discussed above is not possible, so the program branches as indicated at 62, to display "NO DATA" on the "TO CHANGE" display 36 on the readout 30. If at least two data points are stored in the table, a least squares fit is effected as indicated at 64 for the data stored in the lookup table. It has been discovered that a substantially linear relationship exists between the logarithm of the pressure differential across the filter element and usage. Accordingly, since the relationship is a semilogarithmic relationship, a straight line may be fitted from the data points in the form indicated in FIG. 3, where m is the slope of the line and b is the intercept. If at least two data points are available, the line may be fitted, and the slope and intercept of the lines can be calculated as indicated at 66, from this data in a manner well known to those skilled in the art. Once the slope and intercept are known, the equation $$\ln(\Delta p) \text{ equals } m(\text{UMAX}) + b$$

may be solved for UMAX for the maximum pressure drop that is to be permitted across the filter element 20, as indicated at 68 in FIG. 3. UMAX, then, will be the maximum usage that is to be permitted the filter element 18. ΔP is commonly expressed in inches of water, and a typical maximum pressure drop across the filter element 18 is 25 inches of water. For example then, UDIS, the displayed usage, which will be displayed on the display 36 of readout display 30, is set equal to UMAX as calculated by using the equation as indicated in block 68, minus UNEW, the present usage that the filter element 18 has received. This calculation is illustrated at 70 in FIG. 3. The program then returns to the main program as indicated at 72.

One important advantage of the method of the present invention is that the maximum calculated usage (either vehicle distance or engine running time) will be continually corrected if the environment in which the vehicle is operated changes. For example, if the vehicle is driven on public paved highways in a relatively clean environment, and then the vehicle is switched to a duty which includes operation under dusty conditions, the additional data points collected after the duty of the vehicle has been changed will indicate a much higher increase in pressure differential for the same usage increment. Accordingly, the slope m calculated when a display is requested will be continually changed to reflect changes in the environment in which the vehicle is operated. The value for UMAX, the maximum usage to be permitted the filter element, will similarly be changed. Accordingly, the readout display 36 on the readout mechanism 30 will always give a reasonably valid approximation of additional usage, which will continually be corrected as usage of the vehicle increases. Accordingly, a mechanic servicing the vehicle at regular service intervals can determine from the display whether the filter element 18 will require changing before the next service interval. Since the calculation is only a approximation of additional life, the mechanic will change the filter if the displayed additional usage is somewhat close to the next service interval.

I claim:

1. Method of predicting the remaining service life of an air filter element for the combustion air induction system of an internal combustion engine powering a motor vehicle, said filter element having a maximum permitted pressure drop across the filter element representing the maximum service life of said element at which pressure drop said element is no longer usable, means for measuring the pressure drop across said filter element, and means for establishing the usage of said filter element from the initial use of such filter element, comprising the steps of measuring the pressure drop across the filter element at the end of successive usage intervals, memorizing the pressure drop and the usage at the end of each such usage interval, determining from the pressure drop measured at the end of each usage interval and the accumulated usage at the end of each such usage interval the rate at which the pressure drop is increasing, determining from said rate of increase the predicted usage at which said maximum permitted pressure drop will occur, and selectively displaying the usage at which the maximum pressure drop will occur.

2. Method of predicting the remaining service life of an air filter element as claimed in claim 1, wherein said method includes the step of fitting a curve to said pressure drop and usage data, and determining from said curve said rate of pressure drop increase to predict the usage at which said maximum pressure drop will occur.

3. Method of predicting the remaining service life of an air filter element as claimed in claim 2, wherein said curve is a straight line.

4. Method of predicting the remaining service life of an air filter element as claimed in claim 2, wherein said curve represents a semilogarithmic relationship between pressure drop and usage.

5. Method of predicting the remaining service life of an air filter element as claimed in claim 2, wherein said curve is linear in the form of:

$$ln(y) = mx + b$$

where y=pressure drop, x=usage, m=slope, b=intercept.

6. Method of predicting the remaining service life of an air filter element as claimed in claim 5, wherein said method includes the step of calculating slope (m) and intercept (b) using said memorized pressure drop and usage data, and then calculating the usage for the maximum permitted pressure drop using the calculated slope (m) and intercept (b).

7. Method of predicting the remaining service life of an air filter element as claimed in claim 5, wherein the usage intervals and usage are measured in units of distance traveled by the vehicle.

8. Method of predicting the remaining service life of an air filter element as claimed in claim 5, wherein the usage intervals and usage are measured in units of engine running time of said internal combustion engine.

9. Apparatus for predicting the remaining service life of an air filter element for filtering the combustion air of an internal combustion engine for powering a motor vehicle comprising means for measuring the pressure differential across said filter element and generating a signal proportional thereto, means for measuring usage of the engine, a read only memory connected to said pressure differential measuring means, a microprocessor connected to said read only memory, said usage measuring means, and a display device, said microprocessor including means causing said read only memory to record the value of said signal at the end of usage intervals measured by said usage measuring means and being programmed to calculate the rate of increase of said pressure differential across said filter element and to calculate the usage at which a predetermined pressure drop across the filter element will be attained, said display device being caused by said microprocessor to display the difference between the usage at which the predetermined pressure drop will be attained and the usage recorded at the time the calculation is made.

10. Apparatus for predicting the remaining service life of an air filter element as claimed in claim 9, wherein the calculation of the rate of increase of said pressure differential across said filter element is made using the equation:

$$ln(y) = mx + b$$

where y=pressure drop, x=usage, m=slope, b=intercept.

11. Apparatus for predicting the remaining service life of an air filter element as claimed in claim 10, wherein the usage intervals and usage are measured in units of distance traveled by the vehicle.

12. Apparatus for predicting the remaining service life of an air filter element as claimed in claim 10, wherein the usage intervals and usage are measured in units of engine running time of said internal combustion engine.

* * * * *